(12) United States Patent
Tsai

(10) Patent No.: US 9,787,730 B2
(45) Date of Patent: Oct. 10, 2017

(54) DATA SHARING METHOD AND ELECTRONIC DEVICE USING SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: I-Hsuan Tsai, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 230 days.

(21) Appl. No.: 14/847,892

(22) Filed: Sep. 8, 2015

(65) Prior Publication Data
US 2017/0070542 A1    Mar. 9, 2017

(51) Int. Cl.
G06F 15/16    (2006.01)
H04L 29/06    (2006.01)
H04L 29/08    (2006.01)
H04L 12/721    (2013.01)

(52) U.S. Cl.
CPC .......... *H04L 65/1069* (2013.01); *H04L 67/10* (2013.01); *H04L 67/104* (2013.01); *H04L 67/1065* (2013.01); *H04L 67/1068* (2013.01); *H04L 67/2804* (2013.01); *H04L 69/16* (2013.01); *H04L 45/72* (2013.01)

(58) Field of Classification Search
USPC ....... 709/203, 204, 206, 217, 219, 223, 224, 709/226, 228, 231, 232, 238; 714/16; 380/277; 370/389, 392
See application file for complete search history.

(56) References Cited

U.S. PATENT DOCUMENTS

| | | | | |
|---|---|---|---|---|
| 7,764,687 B1 * | 7/2010 | Gao | ........................ | H04L 45/04 370/389 |
| 7,814,185 B2 * | 10/2010 | Choe | ....................... | H04L 45/00 709/221 |
| 8,095,677 B1 * | 1/2012 | Kucherawy | ............. | H04L 61/35 709/230 |
| 8,223,972 B2 * | 7/2012 | Ito | ........................ | H04L 9/0836 380/277 |

(Continued)

FOREIGN PATENT DOCUMENTS

CN    101013948 A    8/2007

*Primary Examiner* — Quang N Nguyen
(74) *Attorney, Agent, or Firm* — Steven Reiss

(57) ABSTRACT

A data sharing method for an electronic device is provided. The method includes: downloading data from a server; broadcasting a first packet to a plurality of other electronic devices in a group to invite the plurality of other electronic devices to form a sharing tree, wherein the electronic device is the root of the sharing tree; determining, at the electronic device, whether a second packet is received from a second electronic device from amongst the plurality of other electronic devices; upon receipt of the second packet, determining whether the second electronic device can be established as a child node of the electronic device based on a predefined algorithm; establishing a connection with the second electronic device; and transmitting the data to the second electronic device.

16 Claims, 11 Drawing Sheets

(56) References Cited

U.S. PATENT DOCUMENTS

| | | | | |
|---|---|---|---|---|
| 8,599,822 | B2* | 12/2013 | Castagnoli | H04L 45/02 |
| | | | | 709/238 |
| 8,879,550 | B2* | 11/2014 | Anand | H04L 63/0227 |
| | | | | 370/392 |
| 9,032,251 | B2* | 5/2015 | Kohnke | G06F 11/1402 |
| | | | | 714/16 |
| 9,280,611 | B2* | 3/2016 | Kong | G06F 17/30961 |
| 9,386,353 | B2* | 7/2016 | Li | H04N 21/64738 |
| 2007/0177594 | A1 | 8/2007 | Kompella | |

\* cited by examiner

FIG. 5

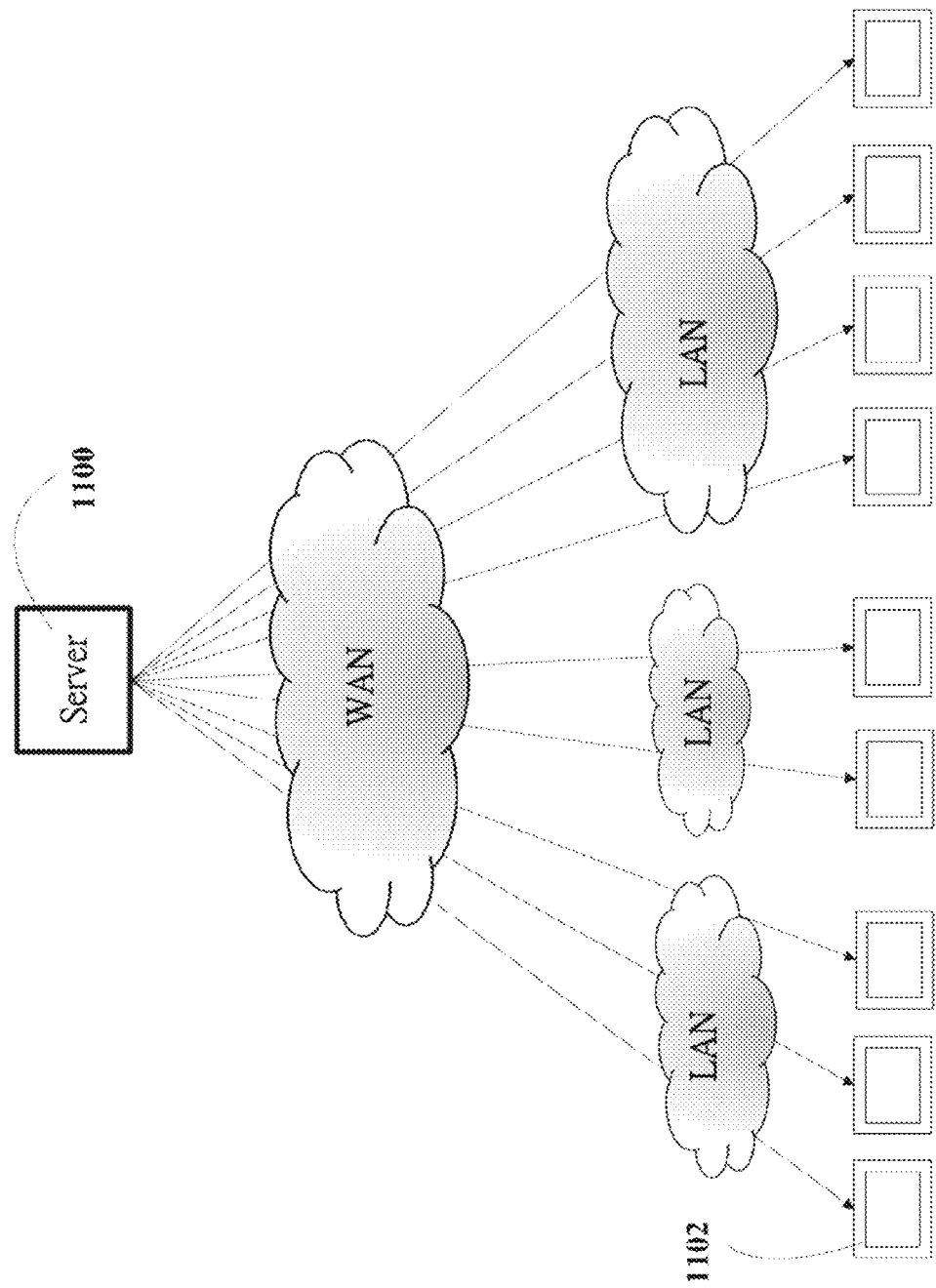

DATA SHARING METHOD AND ELECTRONIC DEVICE USING SAME

FIELD

The subject matter herein generally relates to an electronic device and a method for sharing data among a plurality of electronic devices, and particularly to a data sharing method using a sharing tree and an electronic device using the same.

BACKGROUND

When need to update software or download data to a group of electronic devices, for example, electronic devices in a big organization, the electronic devices generally are coupled to a server which can store data to be download. When all the electronic devices are coupled to the server to download data from the server, a heavy burden will be applied on the server. Moreover, when the electronic devices are coupled to the server through a network, for example, Local Area network (LAN), the network may come to congestion.

BRIEF DESCRIPTION OF THE DRAWINGS

Implementations of the present technology will now be described, by way of example only, with reference to the attached figures.

FIG. 5 is a diagrammatic view of an exemplary embodiment of a data packet.

FIG. 11 is a diagrammatic view of a conventional architecture for data sharing.

DETAILED DESCRIPTION

Figure 1:
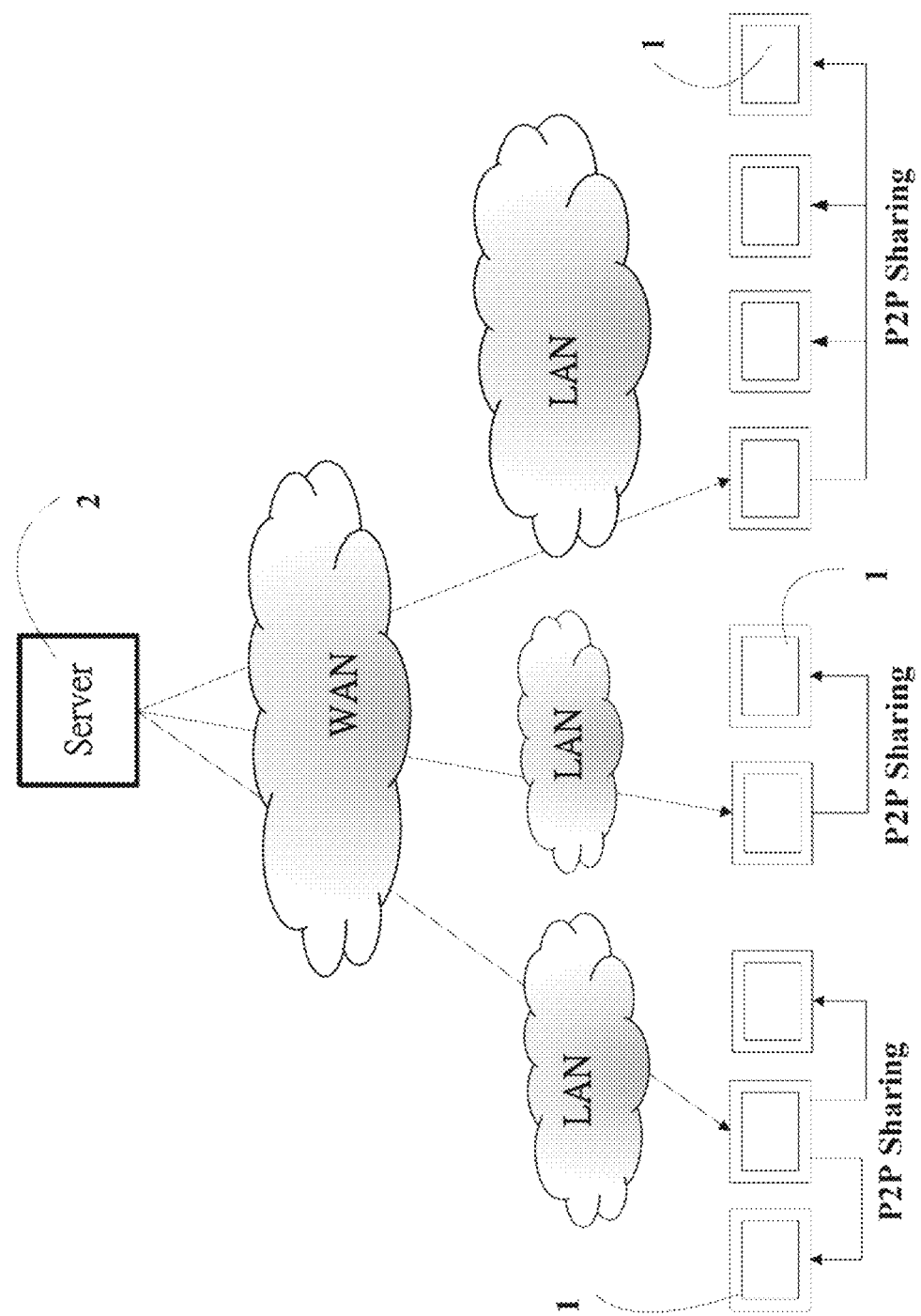
FIG. 1 is a diagrammatic view of an exemplary embodiment of architecture for data sharing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

FIG. 11 illustrates a diagrammatic view of a conventional architecture for data sharing. A plurality of electronic devices 1102, for example, IP telephones, VOIP gateways, computers, are coupled to a server 1100 through a network such as the Internet, or Wide Area Network (WAN). The electronic devices 1102 can be coupled to each other through a network, for example, Local Area Network (LAN). The electronic devices 1102 can be distributed in different LAN. The electronic devices 1102 can download data from the server 1100.

FIG. 1 illustrates a diagrammatic view of an exemplary embodiment of architecture for data sharing. A plurality of electronic devices 1, for example, IP telephones, VOIP gateways, computers, are coupled to a server 2 through a network such as the Internet, or Wide Area Network (WAN). The electronic devices 1 can be coupled to each other through a network, for example, Local Area Network (LAN). The electronic devices 1 can be distributed in different LAN. The electronic devices 1 within a same LAN can form a sharing tree with one of the electronic devices 1 within the same LAN functioning as a seed (also named as a root of the sharing tree) to be coupled to the server 2 to download data from the server 2, while other electronic devices 1 within the same LAN functioning as nodes of the sharing tee to be coupled to the seed to download data from the seed. The electronic devices 1 within a sharing tree can share data in a Point-to-Point (P2P) sharing way.

Figure 2:
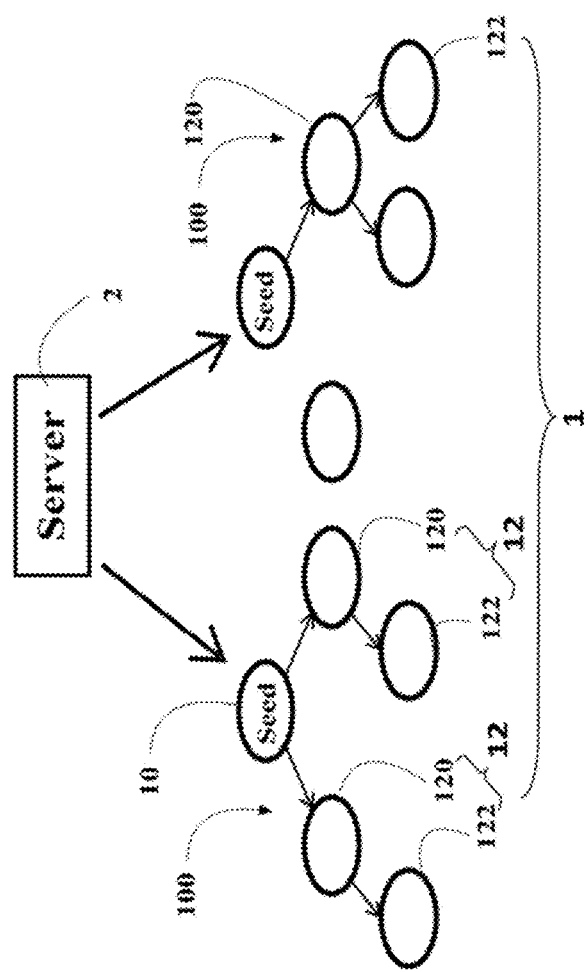
FIG. 2 is a diagrammatic view of an exemplary embodiment of a sharing tree for data sharing.

FIG. 2 illustrates a diagrammatic view of an exemplary embodiment of a sharing tree 100 for data sharing. In the exemplary embodiment, the sharing tree 100 can have a hierarchical structure. The server 2 can be coupled to one or more sharing tree 100. Each sharing tree 100 can include a seed 10 and at least one child node 12 of the seed 10. The seed 10 can function as a root of the sharing tree and function as a parent node of the at least one child node 12. In at least one exemplary embodiment, the at least one child node 12 can have a hierarchical structure and can include at least one parent node 120 and at least one child node 122. A parent node 120 represents a node which has at least one child node. Each child node 122 can has only one parent node 120. In the exemplary embodiment, each parent node 120 can has one or two child node 122.

Figure 3:
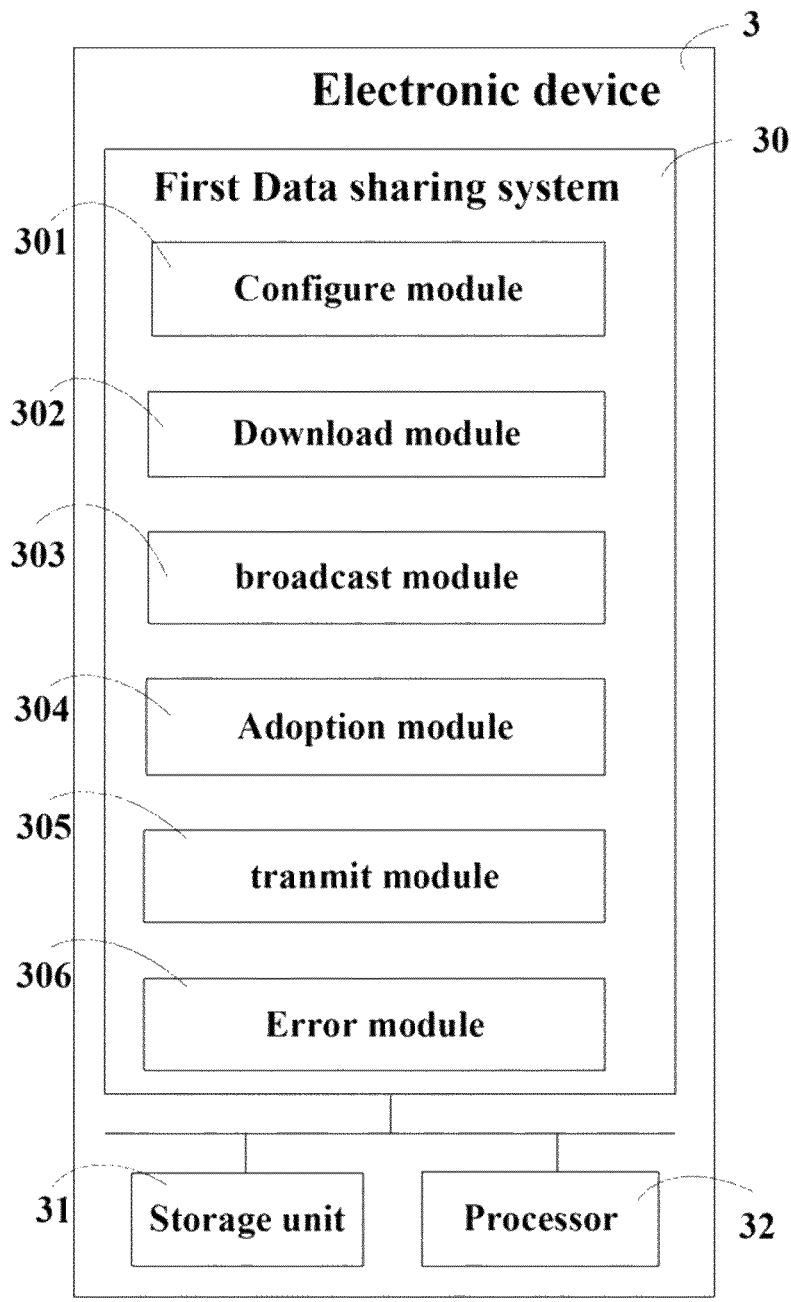
FIG. 3 is a block diagram of an exemplary embodiment of an electronic device.

FIG. 3 illustrates a block diagram of an exemplary embodiment of an electronic device 3 which is a seed. The electronic device 3 can be an IP phone, a VOIP gateway, a personal computer, or any other suitable client device.

The electronic device 3 can include respectively, but is not limited to, a storage device 31 and a processor 32. The processor 32 can be a central processing unit (CPU), a microprocessor, or other data processor chip that performs functions of the electronic device 3. The storage unit 31 can be an internal storage unit of the electronic device 3, for example, a hard disk or memory, or a pluggable memory, for example, Smart Media Card, Secure Digital Card, Flash Card. In at least one embodiment, the storage unit 31 can include two or more storage devices such that one storage device is an internal storage unit and the other storage device is a pluggable memory.

A first data sharing system 30 can include computerized instructions in the form of one or more programs that can be executed by the processor 32. In at least one embodiment, the data sharing system 30 can be integrated in the processor 32. In at least one embodiment, the data sharing system 30 can be independent from the processor 32 and can be stored in the storage unit 31 and coupled to the processor 31. The system 30 can include one or more modules, for example, a configure module 301, a download module 302, a broadcast module 303, an adoption module 304, a transmit module 305 and an error module 306. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The configure module 301 can be configured to configure a profile of the electronic device 3. The profile of the electronic device 3 can include Media Access Control (MAC) address, Internet Protocol (IP) address, Group ID, Product ID, and Organization ID. In the exemplary embodiment, the electronic devices distributed in a predetermined IP address range can be deemed as a group. Each group can have a Group ID. Product ID can be configured to identify different products, for example, different type of products such as computers or telephones, or same type of products with different specification. Organization ID can be configured to identify different organizations where the electronic devices are located. The configure module 301 further can be configured to designate the electronic device 3 as a seed.

The download module 302 can be configured to download data from the server 2.

The broadcast module 303 can be configured to broadcast a notification among the electronic devices within a same group to invite other electronic devices within the same group to become a node of a sharing tree. In at least one embodiment, the broadcast module 303 can broadcast the notification in a predefined frequency, for example, once every 100-300 ms.

Figure 5:
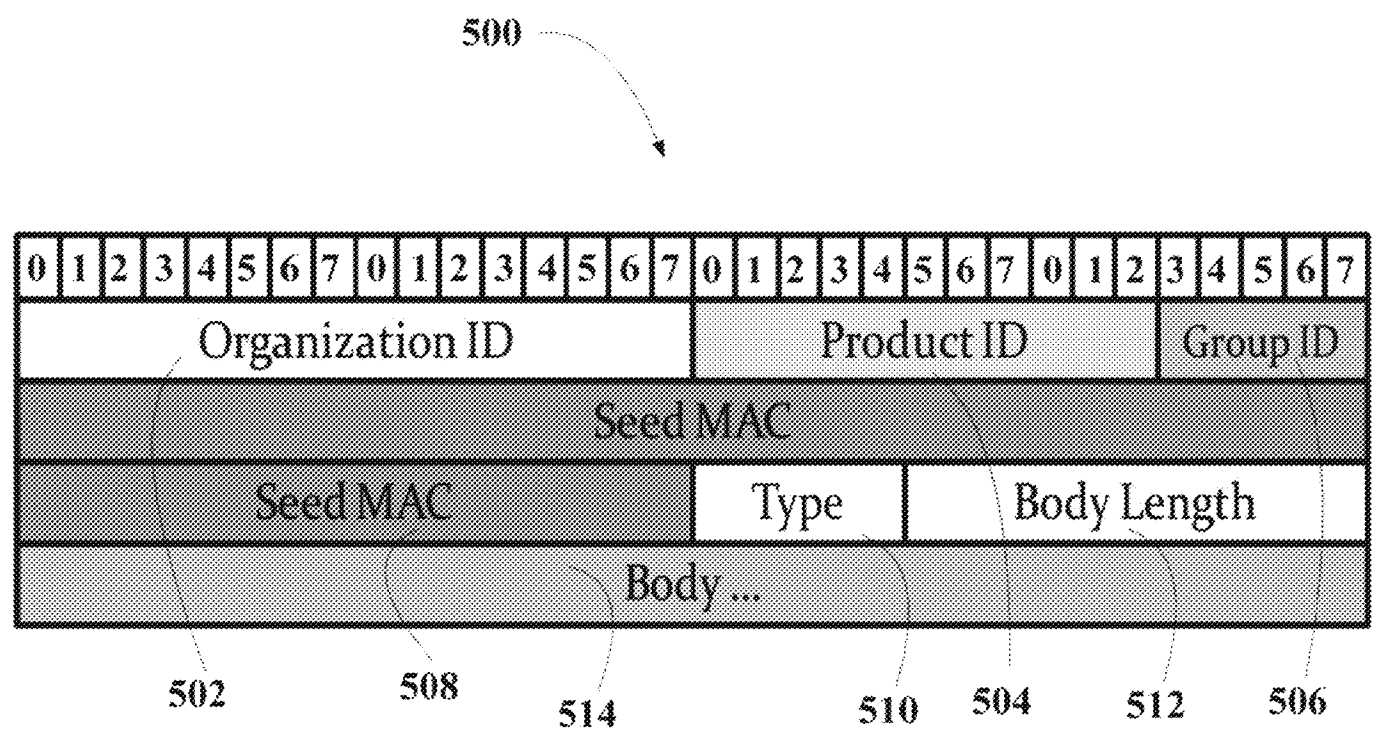

In the exemplary embodiment, the notification or other information transmitted among the electronic devices can be in a form of a packet. An exemplary embodiment of a packet 500 is illustrated in FIG. 5. The packet 500 can define a plurality of fields, including, for example, identification information of an electronic device which sends the packet, a type of the packet, and content of the packet. The identification information can include one or more of Organization ID 502, Product ID 504, Group ID 506, and Seed MAC address 508. Alternatively or additionally, in at least one embodiment, the identification information can include IP address of the electronic device which sends the packet. The type of the packet can be the type field 510. The content of the packet can include Body Length 512, and Body 514. Values of the Organization ID 502, Product ID 504, Group ID 506 of the packet can be extracted from the profile of the electronic device which sends the packet. For example, if the seed sends the packet, the Organization ID, Product ID, Group ID of the packet can be the same with the Organization ID, Product ID, Group ID of the seed. If a parent node sends the packet, the Organization ID, Product ID, Group ID of the packet can be the same with the Organization ID, Product ID, Group ID of the parent node. The Seed MAC address is MAC address of the seed. All the packets sent by the electronic devices in a same group can have only a same Seed MAC address.

The type field 510 can be configured to identify different types of packets. In the exemplary embodiment, the types of packets can include a JoinUS packet, an AdoptMe packet, an Adopt packet, a Data packet, and an Error packet. The type of packet field can be type ID, for example, 0X0 representing a JoinUS packet, 0X1 representing an AdoptMe method, 0X2 representing an Adopt method, 0X3 representing a Data packet, and 0X4 representing an Error packet. The notification broadcasted by the broadcast module 103 can be a JoinUS packet.

The Body field 514 can be configured to be information related to the data downloaded from the server or other notification. Different type of packet can have different body and body length. For example, for a JoinUS packet, the body field can be a profile of the data downloaded from the server and can have a variable length. The Body length filed can identify length of the body field and can have a variable length. The profile of the data downloaded from the server can include size, name, or version of the data. For an AdoptMe method packet, the body field and the body length field can be omitted. For an Adopt packet, the body field can be a Last Bit of a node which sends the Adopt packet and the body length field can be "1" byte. For a Data packet, the body field and the body length can be the same with the JoinUS packet. For an Error packet, the body field can be description of an error, for example, cause of the error. The body length of the Error packet can be "1" byte.

The adoption module 304 can be configured to have another electronic device to be a child node of the electronic device 3. When a first electronic device receives an AdoptMe packet from a second electronic device, the adoption module 304 of the first electronic device can first determine whether the second electronic device can be a child node of the first electronic device and then establish a connection between the first electronic device and the second electronic device and transmit an Adopt packet to the second electronic device. In order to determine whether the second electronic device can be a child node of the first electronic device, the adoption module 304 can first determine whether Organization ID, Product ID, Group ID of the AdoptMe packet is same with the first electronic device, and then determine whether the second electronic device satisfies a predetermined algorithm as illustrated in FIG. 6.

Figure 6:
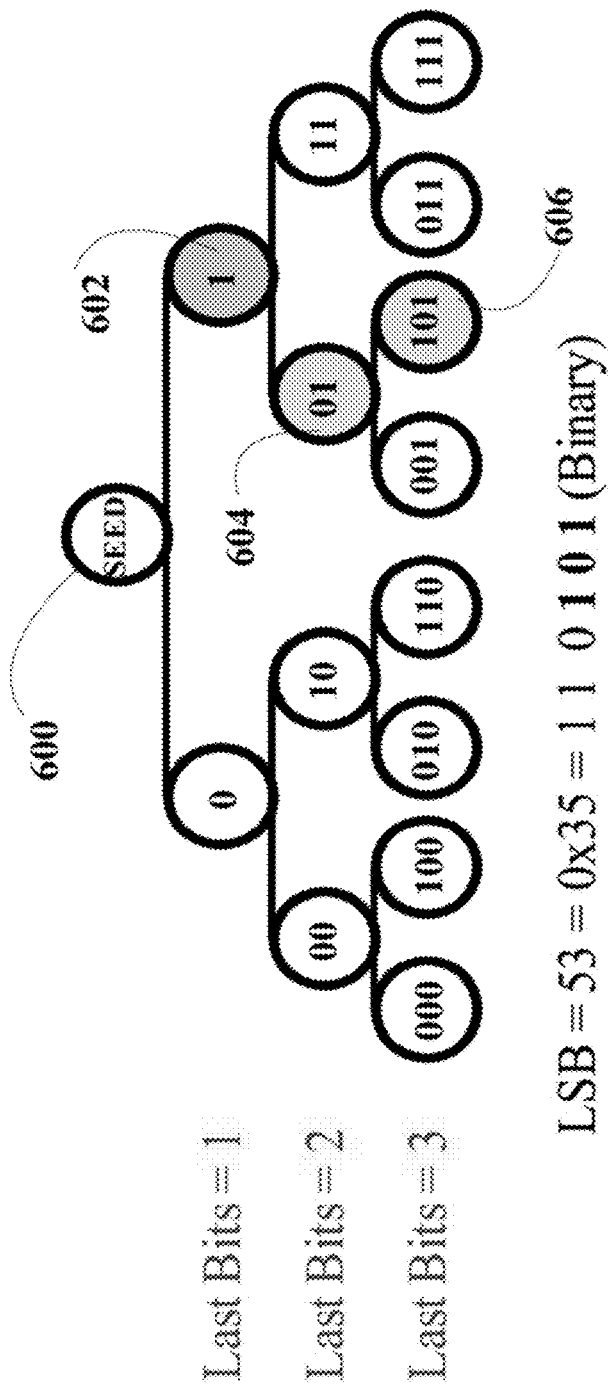
FIG. 6 is a diagrammatic view of an exemplary embodiment of an algorithm for determination a node of a sharing tree.

Referring to FIG. 6, each node of a sharing tree has a Last Bits which can represent a hierarchical level in the sharing tree, for example, the Last Bits of the seed 600 can be "0", the Last Bits of a direct child node 602 of the seed can be "1", and the Last Bits of a direct child node of a parent node can be "1" plus the Last Bits of the parent node. The predetermined algorithm can be: a node can be a child node of a parent node having a Last Bits "N", the node should satisfy: N number of the Least Significant Bits (LSB) of IP address of the node is same with the parent node; if the $N+1^{th}$ LSB of the node is "0", the node can be a left child node of the parent node; if the $N+1^{th}$ LSB of the node is "1", the node can be a right child node of the parent node. For example, a node with IP address 192.168.0.53, the LSB of the node is 53 (110101 in Binary). Since the last bit of the LSB of the node is "1", the node can be a right child node 602 of the seed if the seed 600 has no right child node. Under a condition that a right child node of the seed had already existed, since the last two bits of the LSB of the node is "01", the node can be a left child node 604 of the parent node 602 if the parent node 602 has no left child node. Similarly, under a condition that a left child node of the parent node 602 had already existed, since the last three bits of the LSB of the node is "101", the node can be a right child node 606 of the parent node 604 if the parent node 604 has no right child node.

The adoption module 304 of the first electronic device determine whether the second electronic device satisfy the predetermined algorithm can include: the adoption module 304 can first determine whether the N number of the LSB of the IP address of the second electronic device is same with the first electronic device, under a condition that the first electronic device has a Last Bits "N". If the N number of the LSB of the IP address of the second electronic device is same with the first electronic device, the adoption module 304 determines a corresponding position for the second electronic device, for example, a left child node or a right child node. Finally, the adoption module 304 determines whether the corresponding position have already exist a child node of the first electronic device. If the corresponding position have no a child node of the first electronic device, the second electronic device can become a child node of the first electronic device, otherwise, the second electronic device cannot become a child node of the first electronic device. If the N number of the LSB of the IP address of the second electronic device is different from the first electronic device, the second electronic device cannot become a child node of the first electronic device.

The transmit module 305 can be configured to transmit data packet and data to a child node of the electronic device 3.

The Error module 306 can be configured to transmit an Error packet to corresponding child nodes when an error occurs, for example, connection between the electronic devices is disconnected, or a download failed, or data downloaded is incorrect.

Figure 4:
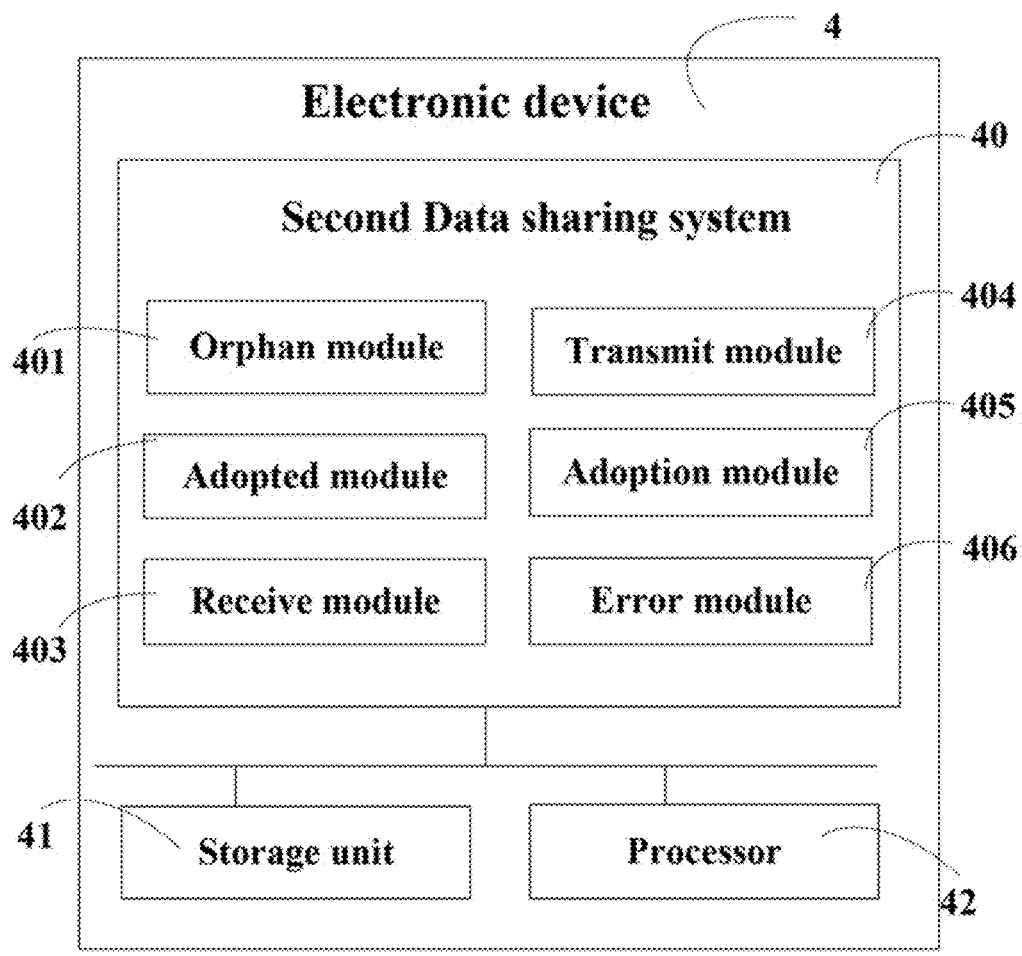
FIG. 4 is a block diagram of another exemplary embodiment of an electronic device.

FIG. 4 illustrates a block diagram of an exemplary embodiment of an electronic device 4 which is not a seed. The electronic device 4 can be an IP phone, a VOIP gateway, a personal computer, or any other suitable client device.

The electronic device 4 can include respectively, but is not limited to, a storage device 41 and a processor 42. The processor 42 can be a central processing unit (CPU), a microprocessor, or other data processor chip that performs functions of the electronic device 4. The storage unit 41 can be an internal storage unit of the electronic device 4, for example, a hard disk or memory, or a pluggable memory, for example, Smart Media Card, Secure Digital Card, Flash Card. In at least one embodiment, the storage unit 41 can include two or more storage devices such that one storage device is an internal storage unit and the other storage device is a pluggable memory.

A second data sharing system 40 can include computerized instructions in the form of one or more programs that can be executed by the processor 42. In at least one embodiment, the data sharing system 40 can be integrated in the processor 42. In at least one embodiment, the data sharing system 40 can be independent from the processor 42 and can be stored in the storage unit 41 and coupled to the processor 42. The system 40 can include one or more modules, for example, an orphan module 401, an adopted module 402, a receive module 403, a transmit module 404, an adoption module 405, and an error module 406.

The orphan module 401 can be configured to cause the electronic device 4 to enter into an orphan state from a normal state. In the exemplary embodiment, an electronic device can have four states, including a normal state, a seed sate, an orphan state, and an adopted state. The normal state is a default state. When an electronic device is coupled to a server and downloads data from the server, the electronic device enters into the seed state. The orphan state represents the electronic device agrees to be a node of a sharing tree. The adopted state represents the electronic device had already become a node of the sharing tree.

When the electronic device 4 receives a JoinUS packet from a seed, the Orphan module 401 can determine whether the Organization ID, Product ID and Group ID of the JoinUS packet is same with the electronic device 4 and determine whether the electronic device 4 wants to be a node of a sharing tree when the Organization ID, Product ID and Group ID of the JoinUS packet is same with the electronic device 4. The orphan module 401 can determine whether the electronic device 4 wants to be a node of the sharing tree based on user selection or a predefined rule, for example, version comparison. If the electronic device 4 wants to be a node of the sharing tree, the electronic device 4 enters into the orphan state.

The adopted module 402 can be configured to cause the electronic device 4 to enter into the adopted state from the orphan state. The adopted module 402 can first enable TCP port of the electronic device 4 and broadcast the AdoptMe packet in the group where the electronic device is located. In at least one embodiment, the adopted module 402 can broadcast the notification in a predefined frequency, for example, once every 100-300 ms. The adopted module 402 then can establish a connection between the electronic device 4 and a parent node when receives a connection request from the parent node. Upon the connection between the parent node and the electronic device 4 is established, the electronic device 4 can stop broadcasting the AdoptMe packet and stop receiving connection request from other node. The adopted module 402 then can cause the electronic device 4 to enter into the adopted state when the electronic device 4 receives the Adopt packet from the parent node which is in a connection with the electronic device 4.

The receive module 403 can be configured to receive data from the parent node which is in a connection with the electronic device 4.

The transmit module 404 can be configured to transmit data packet and data to a child node of the electronic device 4 if the electronic device 4 has a child node.

The adoption module 405 can be configured to have another electronic device to be a child node of the electronic device 4. The adoption module 405 is similar with the adoption module 304. That is, the adoption module 405 can work is a similar way with the adoption module 304.

The error module 406 is similar with the error module 306 and can work in a similar way with the error module 306.

Figure 7:
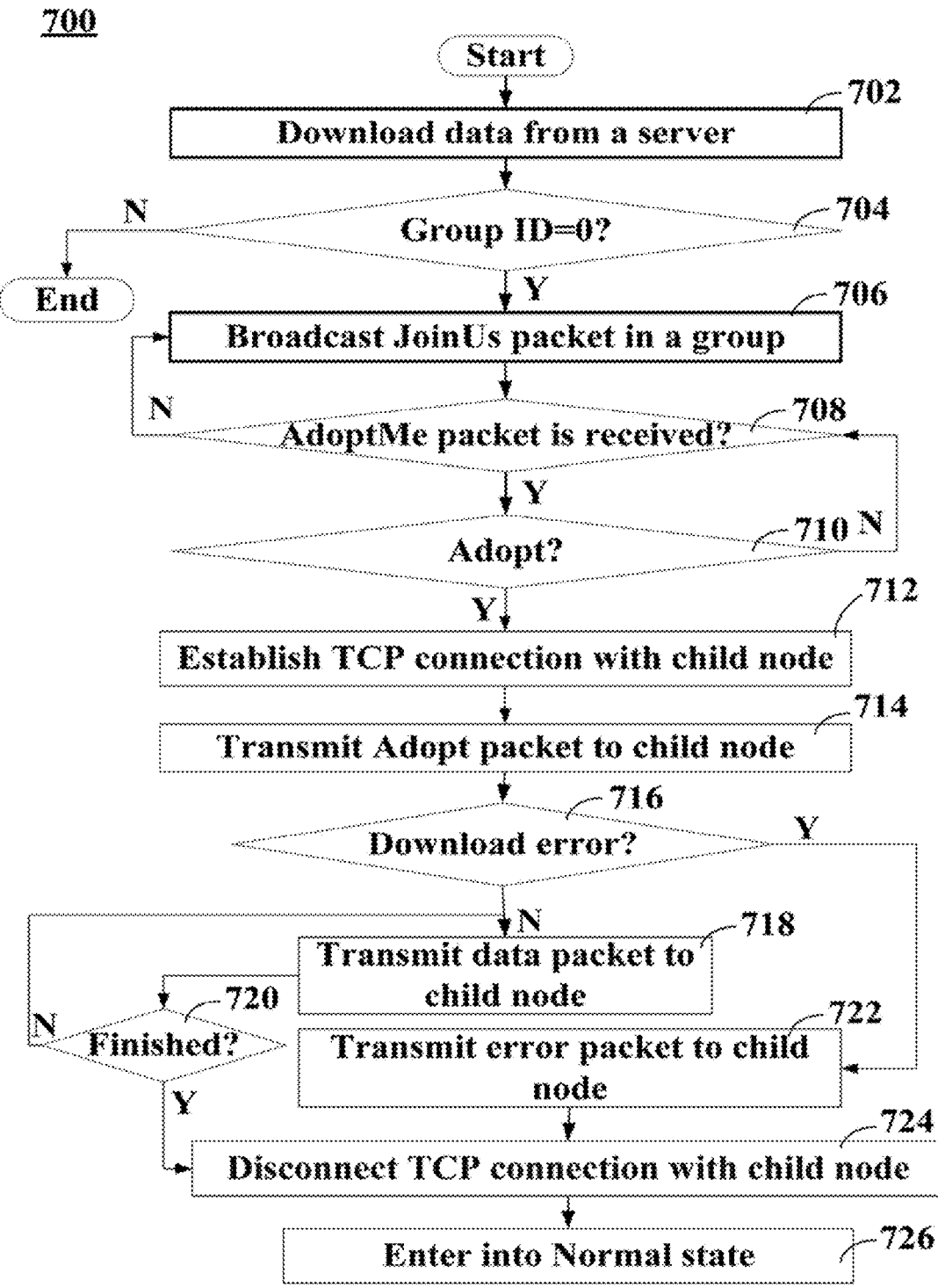
FIG. 7 is a flow chart of an exemplary embodiment of a data sharing method.

FIG. 7 illustrates a flowchart of an exemplary embodiment of a data sharing method 700 performed by an electronic device serving a seed. The example method 700 is provided by way of example, as there are a variety of ways to carry out the method. The method 700 described below can be carried out using the configurations illustrated in FIGS. 1-6, for example, and various elements of the figure is referenced in explaining example method 700. Each block shown in FIG. 7 represents one or more processes, methods or subroutines, carried out in the exemplary method 700. Furthermore, the illustrated order of blocks is by example only and the order of the blocks can change according to the present disclosure. Additional blocks may be added or fewer blocks may be utilized, without departing from this disclosure. The exemplary method 700 can begin at block 702.

At block 702, the electronic device is coupled to a server to download data from the server. At the same time, the electronic device enters into a seed state. The seed state represents that the electronic device wants to invite other electronic devices to form a sharing tree. The data can be image, audio, video, software, text, and etc.

At block 704, the electronic device determines whether the Group ID of the electronic device equals to zero. The Group ID of the electronic device can be stored in a storage unit of the electronic device in advance. Group ID equal to zero represents there is no other electronic device is a same group with the electronic device. As mentioned above, electronic devices coupled to a server can be distributed in different LAN. The electronic devices located in a same LAN can be deeded as a group. Each group can form a hierarchical structured sharing tree. The sharing tree can include a seed serving as a root and a plurality of child node. If the Group ID equals to zero, the process goes to block 706, otherwise, the process goes to an end.

At block 706, the electronic device broadcasts a JoinUS packet in a group where the electronic device is located. In at least one embodiment, the broadcast module 303 can broadcast the JoinUS packet in a predefined frequency, for example, once every 100-300 ms. More detailed description of the JoinUS packet can be referenced as to description of FIG. 5. In the exemplary embodiment, the JoinUS packet is User Datagram Protocol (UDP) based.

At block 708, the electronic device determines whether the electronic device receives an AdoptMe packet from a second electronic device in the group. The AdoptMe packet is also detailed described as in FIG. 5. If the AdoptMe packet is received at the electronic device, the process goes to block 710, otherwise, the process goes back to block 706.

At block 710, the electronic device determines whether the electronic device adopts the second electronic device to be a child node of the electronic device. In detail, the electronic device can determine whether the identifying information, for example, Group ID, Product ID, Organization ID of the AdoptMe packet is same with the electronic device. The electronic device determines whether the second electronic device can be a child node of the electronic device according to the predetermined algorithm if the identifying information of the AdoptMe packet is same with the electronic device. The predetermined algorithm is illustrated in FIG. 6 and related description of FIG. 6. If the second electronic device can become a child node of the electronic device, the process goes to block 712, otherwise, the process goes back to block 708.

At block 712, the electronic device establishes a TCP connection with the child node (the second electronic device). The electronic device first sends a connection request to the child node and then establishes the TCP connection with the child node when the child node accepts the connection request.

At block 714, the electronic device transmits an Adopt packet to the child node. The Adopt packet can include Last Bits of the electronic device. More detailed description of the Adopt packet can be referenced to FIG. 5.

At block 716, the electronic device determines whether an error occurs during downloading data from the server. The error can be the connection between the electronic device and the server is disconnected, or data error. If there is an error occurring, the process goes to block 722, otherwise, the process goes to block 718.

At block 718, the electronic device transmits a data packet to the child node. More detailed description of the data packet can be referenced to FIG. 5.

At block 720, the electronic device determines whether the data is downloaded successfully. If the data is downloaded successfully, the process goes to block 724, otherwise the process goes back to block 718.

At block 722, the electronic device transmits an error packet to the child node to inform the child node of the error. More detailed description of the error packet can be referenced to FIG. 5.

At block 724, the electronic device disconnects the TCP connection with the child node.

At block 726, the electronic device enters into a normal state.

Figure 8:
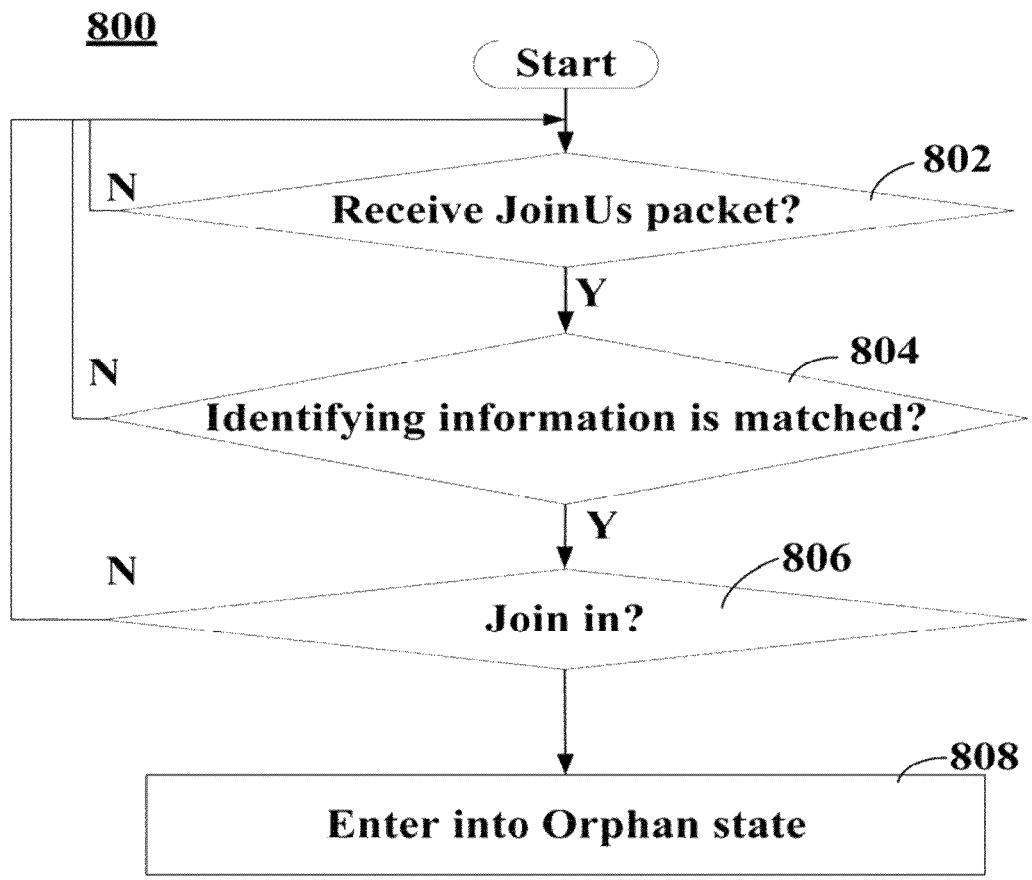
FIG. 8 is a flow chart of another exemplary embodiment of a data sharing method.

FIG. 8 illustrates a flowchart of an exemplary embodiment of a data sharing method 800 performed by an electronic device which is not a seed. The example method 800 is provided by way of example, as there are a variety of ways to carry out the method. The method 800 described below can be carried out using the configurations illustrated in FIGS. 1-6, for example, and various elements of the figure is referenced in explaining example method 800. Each block shown in FIG. 8 represents one or more processes, methods or subroutines, carried out in the exemplary method 800. Furthermore, the illustrated order of blocks is by example only and the order of the blocks can change according to the present disclosure. Additional blocks may be added or fewer blocks may be utilized, without departing from this disclosure. The exemplary method 800 can begin at block 802.

At block 802, the electronic device determines whether the electronic device receives a JoinUS packet from a seed. More detailed description of the JoinUS packet can be referenced to description of FIG. 5. If the electronic device receives the JoinUS packet, the process goes to block 804, otherwise, the process goes to block 802.

At block 804, the electronic device determines whether identifying information of the JoinUS packet is same with the electronic device. If the identifying information of the JoinUS packet is same with the electronic device, the process goes to block 806, otherwise, the process goes back to block 802.

At block 806, the electronic device determines whether the electronic device wants to be a node of the sharing tree. The electronic device can determine whether the electronic device wants to be a node of the sharing tree depend on user selection or a predefined rule, for example, version comparison. If the electronic device wants to be a node of the sharing tree, the process goes to block 808, otherwise, the process goes back to block 802.

At block 808, the electronic device enters into an orphan state. The orphan state represents that the electronic device waits for adoption by a parent node so as to become a child node of the parent node.

Figure 9:
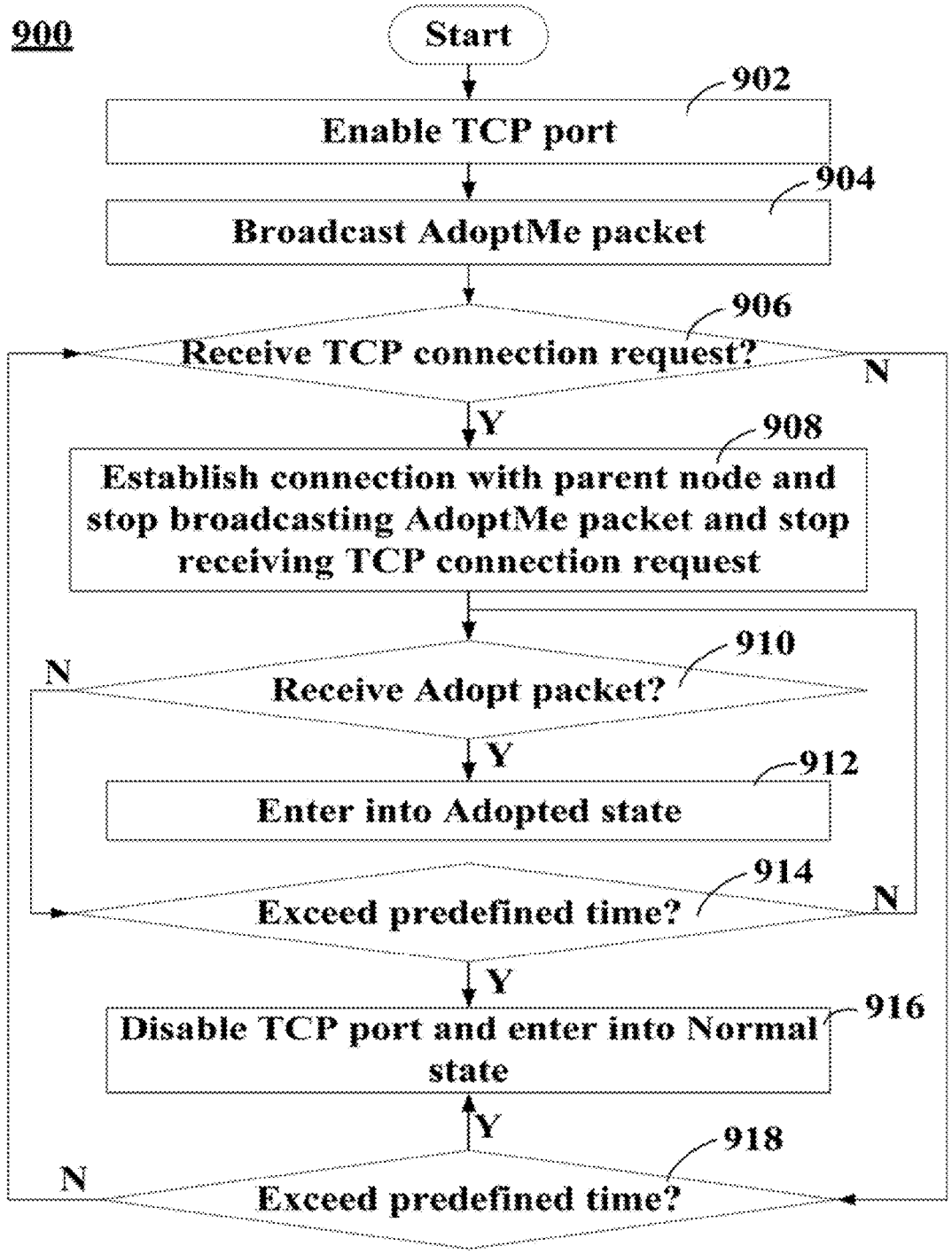
FIG. 9 is a flow chart of another exemplary embodiment of a data sharing method.

FIG. 9 illustrates a flowchart of an exemplary embodiment of a data sharing method 900 performed by an electronic device which is in an orphan state. The example method 900 is provided by way of example, as there are a variety of ways to carry out the method. The method 900 described below can be carried out using the configurations illustrated in FIGS. 1-6, for example, and various elements of the figure is referenced in explaining example method 900. Each block shown in FIG. 9 represents one or more processes, methods or subroutines, carried out in the exemplary method 900. Furthermore, the illustrated order of blocks is by example only and the order of the blocks can change according to the present disclosure. Additional blocks may be added or fewer blocks may be utilized, without departing from this disclosure. The exemplary method 900 can begin at block 902.

At block 902, the electronic device enables a TCP port of the electronic device.

At block 904, the electronic device broadcasts an AdoptMe packet in the group. In at least one embodiment, the broadcast module 303 can broadcast the AdoptMe packet in a predefined frequency, for example, once every 100-300 ms. More detailed description of the AdoptMe packet can be referenced to description of FIG. 5. In the exemplary embodiment, the AdoptMe packet is UDP based.

At block 906, the electronic device determines whether the electronic device receives a TCP connection request from a fourth electronic device. If the electronic device receives a TCP connection request from a parent node, the process goes to block 908, otherwise the process goes back to block 906.

At block 908, the electronic device establishes a TCP connection with the parent node. After the TCP connection with the parent is established, the electronic device stops broadcasting the AdoptMe packet and stops receiving a TCP connection request from other electronic devices.

At block 910, the electronic device determines whether the electronic device receives an Adopt packet from the parent node. If the electronic device receives the Adopt packet, the process goes to block 912, otherwise, the process goes to block 914.

At block 912, the electronic device enters into an Adopted state. The adopted state represents that the electronic device had been become a node of the sharing tree. In the exemplary embodiment, after the electronic device enters into the Adopted state, the Last Bits of the electronic device can be increased by 1.

At block 914, the electronic device determines whether a time interval from time when the TCP port is enabled to current time exceeds a predefined time, for example, 10 seconds. If the time interval exceeds the predefined time, the process goes to block 916, otherwise, the process goes back to block 910.

At block 916, the electronic device disables the TCP port of the electronic device and the electronic device enters into the normal state.

At block 918, the electronic device determines whether a time interval from time when the TCP port is enabled to current time exceeds a predefined time, for example, 10 seconds. If the time interval exceeds the predefined time, the process goes to block 916, otherwise, the process goes back to block 906.

Figure 10:
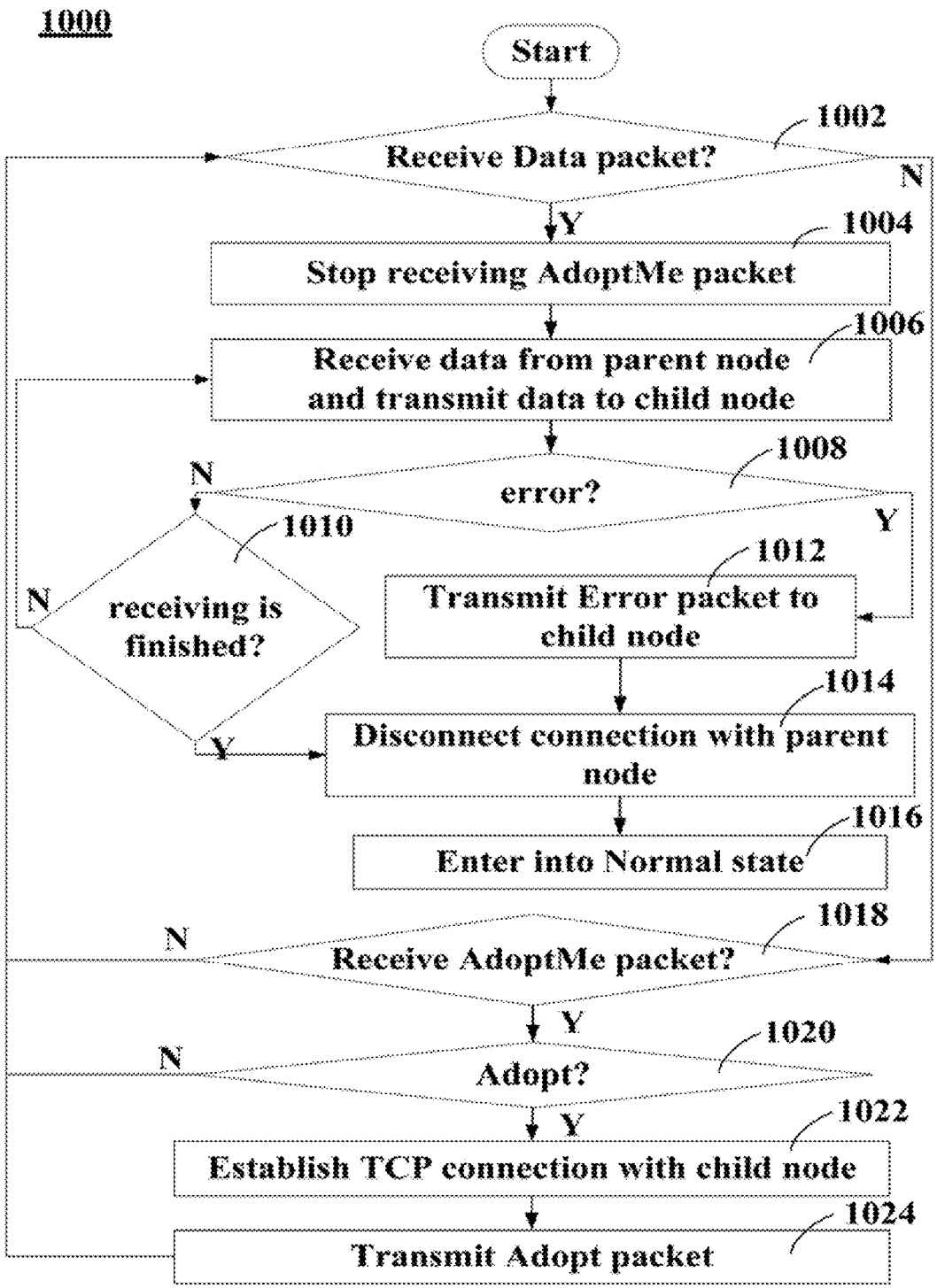
FIG. 10 is a flow chart of another exemplary embodiment of a data sharing method.

FIG. 10 illustrates a flowchart of an exemplary embodiment of a data sharing method 1000 performed by an electronic device which is in an adopted state. The example method 1000 is provided by way of example, as there are a variety of ways to carry out the method. The method 1000 described below can be carried out using the configurations illustrated in FIGS. 1-6, for example, and various elements of the figure is referenced in explaining example method 1000. Each block shown in FIG. 10 represents one or more processes, methods or subroutines, carried out in the exemplary method 1000. Furthermore, the illustrated order of blocks is by example only and the order of the blocks can change according to the present disclosure. Additional blocks may be added or fewer blocks may be utilized, without departing from this disclosure. The exemplary method 1000 can begin at block 1002.

At block 1002, the electronic device determines whether the electronic device receives a data packet from the parent node of the electronic device. If the electronic device receives the data packet from the parent node of the electronic device, the process goes to block 1004, otherwise the process goes to block 1018.

At block 1004, the electronic device stops receiving an AdoptMe packet from other electronic devices in the group.

At block 1006, the electronic device receives data from the parent node and transmits the received data to a child node of the electronic device if the electronic device has a child node.

At block 1008, the electronic device determines whether an error occurring during receiving data from the parent node. The error can include the connection between the electronic device and the parent node is disconnected or the received data is erroneous. If there is an error occurring, the process goes to block 1012, otherwise, the process goes to block 1010.

At block 1010, the electronic device determines whether the receiving data from the parent node is finished successfully. If the receiving is finished successfully, the process goes to block 1014, otherwise, the process goes back to block 1006.

At block 1012, the electronic device transmits an error packet to the child node to inform the child node of the error. More detailed description of the error packet can be referenced as to description of FIG. 5.

At block 1014, the electronic device disconnects the connection with the parent node.

At block 1016, the electronic device enters into the normal state.

At block 1018, the electronic device determines whether the electronic device receives an AdoptMe packet from a fourth electronic device. If the electronic device receives the AdoptMe packet from the fourth electronic device, the process goes to block 1020, otherwise the process goes back to block 1002.

At block 1020, the electronic device determines whether the electronic device adopts the fourth electronic device to be a child node of the electronic device. In detail, the electronic device can determine whether the identifying information, for example, Group ID, Product ID, Organization ID of the AdoptMe packet is same with the electronic device. The electronic device determines whether the fourth electronic device can be a child node of the electronic device according to the predetermined algorithm if the identifying information of the AdoptMe packet is same with the electronic device. More detailed description of the predetermined algorithm can be referenced as to description of FIG. 6. If the fourth electronic device can become a child node of the electronic device, the process goes to block 1022, otherwise, the process goes back to block 1002.

At block 1022, the electronic device establishes a TCP connection with the child node (the fourth electronic device). The electronic device first sends a connection request to the child node and then establishes the TCP connection with the child node when the child node accepts the connection request.

At block 1024, the electronic device transmits an Adopt packet to the child node. The Adopt packet can include Last Bits of the electronic device. More detailed description of the Adopt packet can be referenced to FIG. 5.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data sharing method comprising:
downloading, at an electronic device, data from a server;
broadcasting, at the electronic device, a first packet to a plurality of other electronic devices in a group to invite the plurality of other electronic devices to form a sharing tree, wherein the electronic device is the root of the sharing tree, the first packet includes identification information of the electronic device, a type of the packet, and content of the packet;
determining, at the electronic device, whether a second packet is received from a second electronic device from amongst the plurality of other electronic devices, the second packet containing a request that the second electronic device be a child node of the electronic device and including identification information of the second electronic device;
upon receipt of the second packet, determining, at the electronic device, whether the second electronic device can be established as a child node of the electronic device based on a predefined algorithm, the predefined algorithm requiring that each parent node can have a left child node and right child node at most, and each node can have only one parent node;
establishing, at the electronic device, a connection with the second electronic device; and
transmitting the data to the second electronic device from the electronic device;
wherein the predefined algorithm further requires: N number of least significant bits of the binary IP address of a child node is same with the parent node; the $N+1^{th}$ of the least significant bits of the binary IP address of the left child node is "0", while the $N+1^{th}$ of the least significant bits of the binary IP address of the right child node is "1"; N represents level of the parent node in the sharing tree, level of the child node is N+1, and level of the root of the sharing tree is "0".

2. The method according to claim 1, further comprising:
determining, at the electronic device, whether the identification information of the second electronic device defined in the second packet is same with a profile of the electronic device; and
determining, at the electronic device, whether the second child can be established as child node of the electronic device according to the predefined algorithm if the identification information of the second electronic device is same with a profile of the electronic device.

3. The method according to claim 1, further comprising:
transmitting, at the electronic device, a notification to the child node of the electronic device to inform the child node of the electronic device that an error occurs if the error occurs during downloading the data from the server; and
disconnecting, at the electronic device, the connection between the electronic device and the child node.

4. The method according to claim 1, wherein the connection between the electronic device and the child node is a transmission control protocol (TCP) connection.

5. The method according to claim 1, wherein the first packet is User Datagram Protocol (UDP) based, and the second packet is TCP based.

6. The method according to claim 1, wherein the identification information comprises one or more of: organization ID, product ID, group ID, seed Media Access Control (MAC) address which is MAC address of the root of the sharing tree.

7. A data sharing method, comprising:
determining, at an electronic device, whether a first packet is received from a second electronic device, wherein the first packet indicates that the second electronic device wants to create a sharing tree to share data to the first electronic device, the second electronic device being a root of the sharing tree, and the first packet includes identification information of the second electronic device and content of the data to be shared;
upon receipt of the first packet, determining, at the electronic device, whether the identification information of the second electronic device is same with the electronic device;
determining, at the electronic device, whether the electronic device wants to be a node of the sharing tree;
enabling, at the electronic device, a communication port of the electronic device if the electronic device wants to be a node of the sharing tree;
broadcasting, at the electronic device, a second packet containing a request that the electronic device be a node of the sharing tree;
receiving, at the electronic device, a connection request from the second electronic device as a parent node;
establishing, at the electronic device, a connection with the parent node through the communication port;
receiving, at the electronic device, the data from the parent node; and
determining, at the electronic device, whether a third packet is received from a whether the third electronic device can be established as a child node of the electronic parent node can have a left child node and right child node at most, and each node can have only one parent node; establishing, at the electronic device, a connection with the third electronic device if the third electronic device can become a child node of the electronic device; and transmitting, at the electronic device, a notification to the third electronic device indicating that the third electronic device has become a child node of the electronic device;
wherein the predefined algorithm further requires: N number of least significant bits of the binary IP address of a child node is same with the parent node; the $N+1^{th}$ of the least significant bits of the binary IP address of the left child node is "0", while the $N+1^{th}$ of the least significant bits of the binary IP address of then ht child node is "1"; N represents level of the parent node in the sharing tree, level of the child node is N+1, and level of the root of the sharing tree is "0".

8. The method according to claim 7, further comprising:
transmitting, at the electronic device, the data to a child node of the electronic device.

9. The method according to claim 7, further comprising:
determining, at the electronic device, whether an error occurs during receiving the data from the parent node;
transmitting, at the electronic device, a notification to the child node to inform the child node of the error if the error occurs; and
disconnecting, at the electronic device, the connection between the parent node and the child node.

10. The method according to claim 7, further comprising:
disabling, at the electronic device, the communication port if the electronic device cannot be established as a node of the sharing tree within a predetermined time from the communication port is enabled.

11. An electronic device, comprising:
a storage unit configured to store instructions; and
a processor configured to execute instructions to cause the processor to:
  download data from a server;
  broadcast a first packet to a plurality of other electronic devices in a group to invite the plurality of other electronic devices to form a sharing tree, wherein the electronic device is the root of the sharing tree, the first packet includes identification information of the electronic device, a type of the packet, and content of the packet;
  determine whether a second packet is received from a second electronic device from amongst the plurality of other electronic devices, the second packet containing a request that the second electronic device be a child node of the electronic device and including identification information of the second electronic device;
  upon receipt of the second packet, determine whether the second electronic device can be established as a child node of the electronic device based on a predefined algorithm, the predefined algorithm requiring that each parent node can have a left child node and right child node at most, and each node can have only one parent node;
  establish a connection with the second electronic device; and
  transmit the data to the second electronic device;
  wherein the predefined algorithm further requires: N number of least node; the $N+1^{th}$ of the least significant bits of the binary IP address of the left child node is "0", while the $N+1^{th}$ of the least significant bits of the binary IP address of the right child node is "1"; N represents level of the parent node in the sharing tree, level of the child node is N+1 and level of the root of the sharing tree is "0".

12. The electronic device according to claim 11, wherein the instructions further cause the processor to:
  determine whether the identification information of the second electronic device defined in the second packet is same with a profile of the electronic device; and
  determine whether the second child can be established as a node of the electronic device according to the predefined algorithm if the identification information of the second electronic device is same with a profile of the electronic device.

13. The electronic device according to claim 11, wherein the instructions further cause the processor to:
  transmit a notification to the child node of the electronic device to inform the child node of the electronic device that an error occurs if the error occurs during downloading the data from the server; and
  disconnect the connection between the electronic device and the child node.

14. The electronic device according to claim 11, wherein the connection between the electronic device and the child node is a transmission control protocol (TCP) connection.

15. The electronic device according to claim 11, wherein the first packet is User Datagram Protocol (UDP) based, and the second packet is TCP based.

16. The electronic device according to claim 11, wherein the identification information comprises one or more of: organization ID, product ID, group ID, seed Media Access Control (MAC) address which is MAC address of the root of the sharing tree.

* * * * *